(12) United States Patent
Holder

(10) Patent No.: US 6,487,067 B1
(45) Date of Patent: Nov. 26, 2002

(54) SEALING DEVICE FOR ELECTROLYTIC CAPACITOR AND METHOD

(75) Inventor: Randy James Holder, Central, SC (US)

(73) Assignee: Cornell Dubilier Marketing, Inc., Liberty, SC (US)

( * ) Notice: Subject to any disclaimer, the term of this patent is extended or adjusted under 35 U.S.C. 154(b) by 0 days.

(21) Appl. No.: 09/382,316

(22) Filed: Aug. 24, 1999

(51) Int. Cl.[7] .................................................. H01G 9/10
(52) U.S. Cl. ........................................ 361/519; 361/537
(58) Field of Search ................................. 361/503, 508, 361/509, 510, 511, 516, 517, 518, 519, 520, 521, 536, 537, 538; 29/25.03

(56) References Cited

U.S. PATENT DOCUMENTS 3,806,769 A * 4/1974 Derrick et al. ............... 361/303
3,824,327 A * 7/1974 Barker et al. ............ 174/17 LF
5,798,906 A * 8/1998 Ando et al. .................. 361/520
6,006,133 A * 12/1999 Lessar et al. ..................... 607/5

* cited by examiner

Primary Examiner—Anthony Dinkins
Assistant Examiner—Eric Thomas

(57) ABSTRACT

A flat pack electrolytic capacitor includes an aluminum end cap having an electrolyte fill hole that is sealed with a seal mechanism to preclude electrolyte leakage under normal operating conditions. The end cap is welded to an open-ended aluminum case in which a capacitor is inserted and the hole is sealed with an O ring and closed end pop rivet after the case is filled with electrolyte. The O ring is initially compressed during positioning of the rivet and further compressed when the closed end rivet is installed.

5 Claims, 2 Drawing Sheets

SEALING DEVICE FOR ELECTROLYTIC CAPACITOR AND METHOD

BACKGROUND OF THE INVENTION

This invention relates generally to capacitors and specifically to metal cased electrolytic capacitors having an epoxy sealant.

Flat pack electrolytic capacitors are well known in the art as exemplified by U.S. Pat. No. Des. 353,575, issued Dec. 20, 1994 and assigned to the assignee of the present invention. While the design patent does not indicate the manner of construction of the flat pack capacitor, in practice, an open-ended aluminum case is sealed with a welded end cap that includes an electrolyte fill hole (and connecting leads for the capacitor in the case). Welding the case and cover after installation of the electrolyte often leads to boiling away of the electrolyte with consequent deterioration in the life of the capacitor. Filling the case with electrolyte after welding eliminates the above-mentioned problem, but requires that an elastic plug seal or the like be installed in the fill hole and further that the entire end cap (which is dish-shaped) be filled with an epoxy sealant. The present invention utilizes low cost off-the-shelf parts to provide a seal mechanism for the fill hole to preclude leakage of electrolyte under normal operating conditions. As is common practice vents are provided in the case to permit any gases that may be generated under abnormal operating conditions to be safely vented to the atmosphere. With the invention, the need for the epoxy sealant is obviated. The method of manufacture also lends itself to automation.

BRIEF SUMMARY OF THE INVENTION

In accordance with the invention, an electrolytic flat pack capacitor is constructed by welding an end cap to a case containing the capacitor and filling the case with an electrolyte via a fill hole in the end cap. A seal mechanism is installed in the fill hole, which seal mechanism precludes leakage of electrolyte under normal operating conditions in the preferred embodiment of the invention, the seal mechanism comprises an elastic O ring that is controllably compressed by a closed end pop rivet.

BRIEF DESCRIPTION OF THE DRAWINGS

The invention will be apparent upon reading the following description thereof in conjunction with the drawings in which.

DETAILED DESCRIPTION OF THE INVENTION

Figure 1:
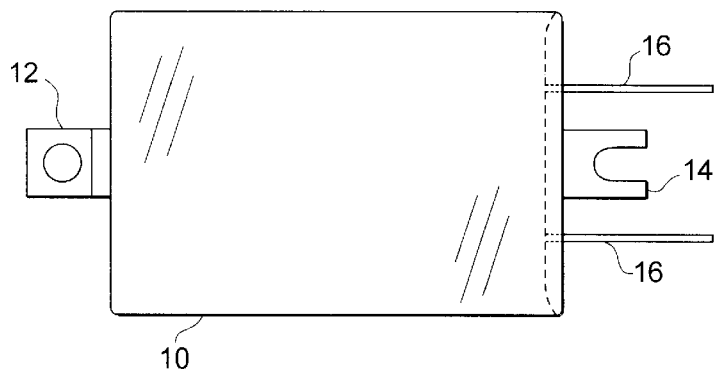
FIG. 1 is a flat pack electrolytic capacitor constructed in accordance with the invention.
Figure 2:
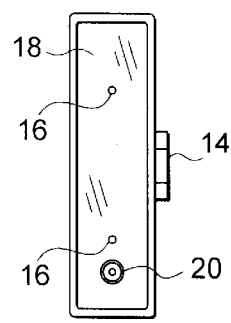
FIG. 2 is an end view of the capacitor of FIG. 1.
Figure 3:
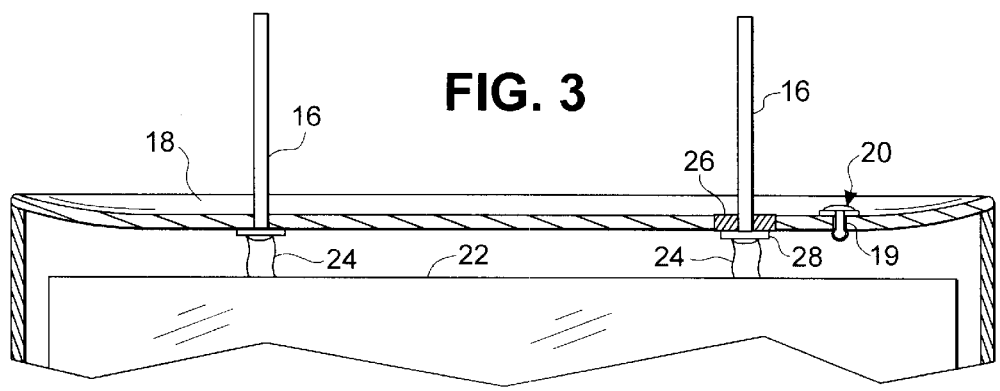
FIG. 3 is an enlarged, cross sectional view of the end cap and a portion of the case of the inventive capacitor.
Figure 4:
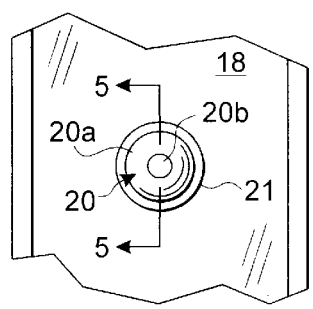
FIG. 4 is a plan view of the seal mechanism used in the inventive capacitor.
Figure 5:
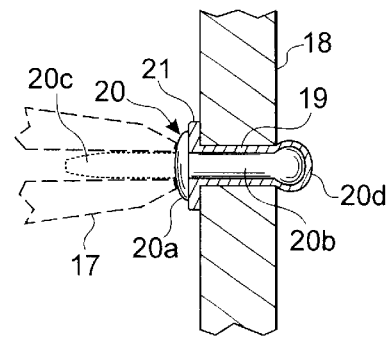
FIG. 5 is a view taken along line 5—5 of FIG. 4.

Referring to FIGS. 1, 2 and 3, a flat pack electrolytic capacitor has a generally rectangular open-ended case 10 with mounting tabs 12 and 14 affixed at opposite ends thereof. A slightly dished end cap 18, having provisions for securing a pair of connecting leads 16 thereto, is sealed to the open end of case 10, preferably by welding. In practice, end cap 18 is formed of 0.062" type 1100 aluminum. Case 10 is preferably made of thinner, drawn aluminum with end cap 18 being secured in a sealing relationship with the open end of case 10 by TIG welding. It is recognized that other suitable materials may be used for the case 10 and the end cap 18 of the capacitor. Connecting leads 16 is welded to end cap 18 and the other connecting lead 16 is insulated from the end cap, such as, for example, by being passed through an insulating grommet 26 in a suitable hold in end cap 18. A metal connecting plate 28 is connected to the insulated one of connecting leads 16 and to the corresponding one of foil elements 24. Electrolytic capacitor 22 is formed in the usual manner by rolling insulated conductive foil and pressing the resulting structure into a generally flat shape to fit within case 10. After the flexible metal foil elements 24 are electrically connected between the capacitor 22 and the connecting leads 16 on the end cap 18, the end cap 18 is welded to the case. An electrolyte fill hole 19 is provided in end cap 18 to enable electrolyte (not shown) to be introduced to the interior of case 10 after end cap 18 is welded thereto. After the case has been filled with electrolyte, a seal mechanism is secured in fill hole 19. As shown in FIGS. 4 and 5, the seal mechanism of the invention comprises the combination of an elastic O ring and a closed end blind rivet such as the type of Pop® rivet distributed by Emhart Fastening Technologies of Shelton, Connecticut, as part number 4AD41AH.

A conventional elastic O ring 21 is positioned around the fill hole 19 and a conventional closed end blind rivet 20 is inserted through O ring 21 and fill hole 19. Closed end blind rivet 20 has a washer-like head 20a that is affixed to a tubular shaft 20b. The blind rivet also includes a breakaway road or mandrel 20c that extends through shaft 20b and terminates in an expandable closed end 20d of tubular shaft 20b. The blind rivet fits within the fill hole 19. The nose 17 of a rivet gun is used to apply an initial compressive force on O ring 21, which is squeezed between head 20a of the pop rivet and end cap 18. Operation of the rivet gun causes gripping jaws (not shown) in the nose of the blind rivet gun to exert a pulling force on mandrel 20c, causing an expansion of the expandable end 20d of tubular shaft 20b and further compressing O ring 21. At a prescribed force, mandrel 20c separates from the blind rivet structure, leaving the closed end of shaft 20b to maintain a securing relationship between end cap 18, O ring 21 and the head 20a of blind rivet 20. This action creates a seal for fill hole 19 that is sufficient to prevent leakage of the electrolyte under normal operating conditions and obviates the need for the epoxy sealant used in the prior art construction.

Figure 6:
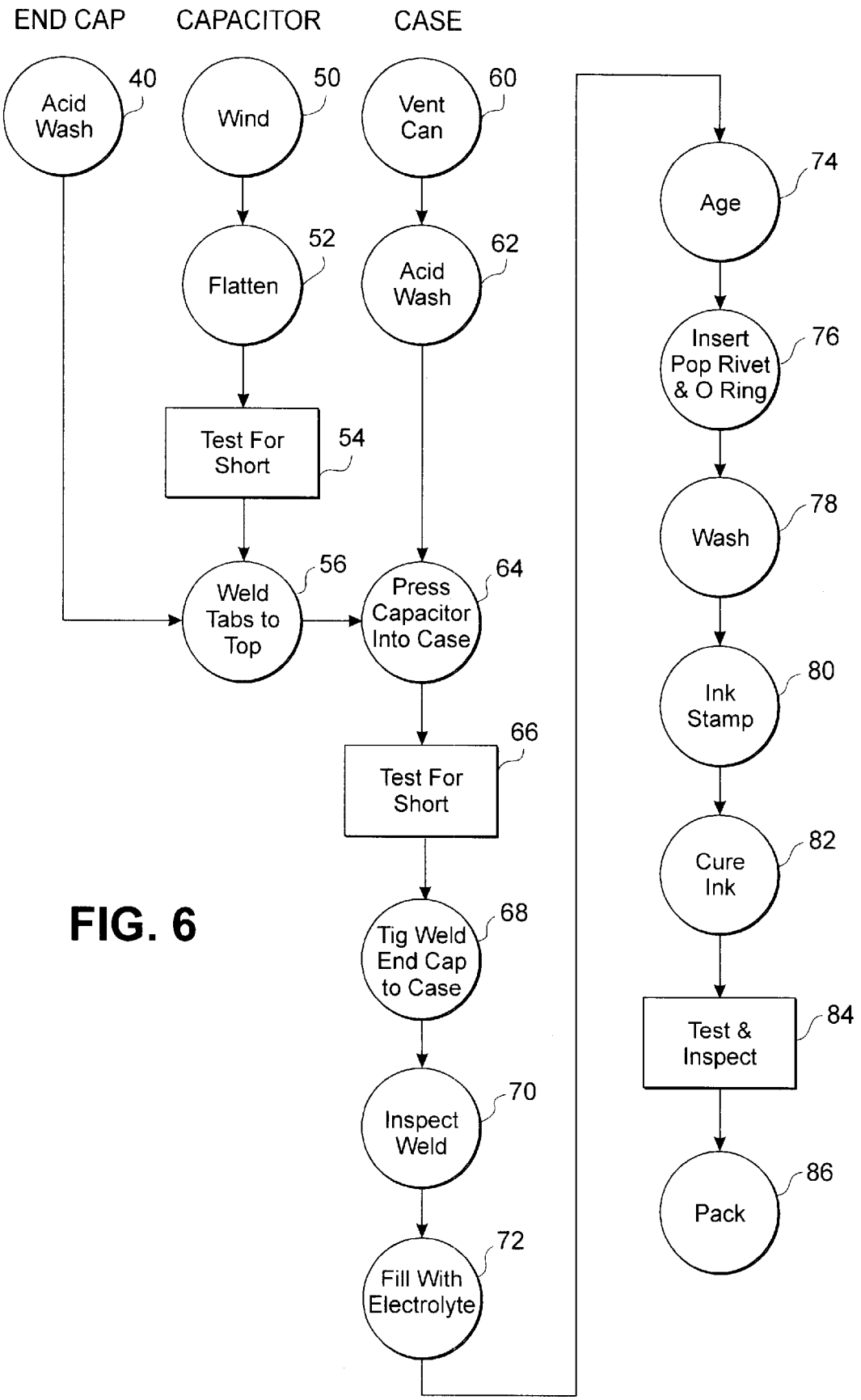
FIG. 6 is a flow chart of the method of manufacture of the inventive capacitor.

FIG. 6 is a flow chart illustrating the construction of the electrolytic flat pack capacitor of the invention. Commencing at step 40, the end cap is subjected to an acid wash. The capacitor is wound in step 50, flattened in step 52, tested for shorts in step 54 and has foil connection tabs welded thereto in step 64. The case is vented in step 60, subjected to an acid wash in step 62 and the end cap and the capacitor are installed in step 64. Another test for shorts is conducted in step 66 and the end cap is TIG welded to the case in step 68, followed by a weld inspection in step 70. In step 72, the electrolyte is introduced into the case through the fill hole in the end cap and the unit is allowed to age in step 74. The O ring and blind rivet are installed in the fill hole in step 76. Thereafter, the unit is washed (step 78) and inked in step 80 with the appropriate information as to size, rating, manufacturer, etc. The ink is cured in step 82, the finished capacitor is inspected and tested in step 84 and packed for shipment in step 86.

In the preferred embodiment of the invention, the O ring is made of ethylene propylene material having a durometer of 70 using a Shore A scale. Its outer diameter is 0.234", its inner diameter is 0.101" and it has a thickness of 0.062". The blind rivet is made of 1100 aluminum, has a tubular shaft diameter of 0.124", a head diameter of 0.236", a head thickness of 0.036", a minimum mandrel length of 1.00", a mandrel diameter of 0.072" and the tubular shaft has a length of 0.237" and a grip range of 0.032"–062". The specifications are that the O ring must be initially compressed from 0.062" to 0.052" by the rivet gun nose before pulling the mandrel from the rivet. During the pulling, the O ring is compressed another 0.012" to a final thickness of 0.040". With this arrangement, a seal is provided that prevents leakage or evaporation of the electrolyte under normal operating conditions of the capacitor.

What has been described is a novel electrolytic flat pack capacitor of simplified construction that lends itself to automated manufacture. It is recognized that numerous changes to the described embodiment of the invention will be apparent to those skilled in the art without departing from its true spirit and scope. The invention is to be limited only as defined in the claims.

What is claimed is:

1. An electrolytic capacitor comprising:
   a case;
   a capacitor fitted in said case;
   an end cap, having an electrolyte fill hole, secured at one end of said case;
   an electrolyte in said case; and
   a seal mechanism for sealing said case to prevent electrolyte leakage under normal operating conditions, said seal mechanism comprising an elastic O ring over said fill hole and a closed end blind rivet compressing and sealing said O ring to said end cap.

2. The capacitor of claim 1, wherein said O ring is initially compressed when said blind rivet is positioned in said fill hole and is further compressed when said blind rivet is installed.

3. An electrolytic capacitor comprising:
   an open-ended aluminum case;
   a capacitor fitted in said aluminum case;
   an aluminum end cap, having an electrolyte fill hole, welded to said open ended aluminum case;
   an electrolyte in said case;
   an elastic O ring positioned about said fill hole;
   a closed end blind rivet extending through said O ring and said fill hole; and
   said closed end blind rivet compressing said O ring to form a seal for preventing electrolyte leakage from said case during normal operation of said capacitor.

4. The capacitor of claim 3, wherein said elastic O ring comprises an ethylene propylene material having an outside diameter of about 0.243", an inside diameter of about 0.101" and a thickness of about 0.062" and wherein said thickness of said O ring is about 0.040" when fully compressed.

5. The capacitor of claim 4, wherein said closed end blind rivet is of type 1100 aluminum with a head diameter of about 0.236", a body diameter of about 0.124" and a grip range of about 0.032"–0.062".

* * * * *